(12) United States Patent
Dollar et al.

(10) Patent No.: US 8,516,067 B2
(45) Date of Patent: *Aug. 20, 2013

(54) CLEARINGHOUSE FOR MESSAGES BETWEEN DISPARATE NETWORKS

(75) Inventors: Graeme R. Dollar, Menlo Park, CA (US); Alexander Q. Musil, Sunnyvale, CA (US); Thyagarajapuram S. Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,036

(22) Filed: Jun. 27, 2012

(65) Prior Publication Data

US 2012/0271897 A1    Oct. 25, 2012

Related U.S. Application Data

(63) Continuation of application No. 12/545,002, filed on Aug. 20, 2009, now Pat. No. 8,230,029, which is a continuation of application No. 11/125,809, filed on May 10, 2005, now Pat. No. 7,626,991.

(60) Provisional application No. 60/569,915, filed on May 10, 2004.

(51) Int. Cl.
*G06F 15/16* (2006.01)
*G06F 15/173* (2006.01)
*H04M 3/42* (2006.01)
*H04W 4/00* (2009.01)
*H04J 3/16* (2006.01)

(52) U.S. Cl.
USPC ........ 709/206; 709/224; 709/246; 455/414.1; 455/445; 370/465; 370/466

(58) Field of Classification Search
USPC ................. 709/206, 224, 246; 455/414, 445; 370/465, 466
See application file for complete search history.

(56) References Cited

U.S. PATENT DOCUMENTS

| 5,933,412 | A | 8/1999 | Choudhury et al. | |
|---|---|---|---|---|
| 6,034,970 | A | 3/2000 | Levac et al. | |
| 6,625,646 | B1 * | 9/2003 | Kamanaka et al. | 709/224 |
| 7,035,942 | B2 * | 4/2006 | Daniell et al. | 709/246 |

(Continued)

OTHER PUBLICATIONS

Notification of Transmittal of the International Search Report and the Written Opinion of the International Searching Authority, or the Declaration for international Application No. PCT/US05/16490 dated Jul. 6, 2006.

(Continued)

*Primary Examiner* — Emmanuel L Moise
*Assistant Examiner* — Farzana Huq
(74) *Attorney, Agent, or Firm* — James J. DeCarlo; Greenberg Traurig, LLP

(57) ABSTRACT

A system and method are directed towards managing interoperability between disparate IM networks. A clearinghouse server is provided that receives IM messages from disparate IM networks. The clearinghouse server examines the IM message to determine it is in a compatible protocol for a destination IM network. If the IM message is incompatible a translation service is used to translate the message into a compatible protocol. The translation service further determines if the destination IM network supports a feature employed by the received IM message. If the feature is supported or can be translated to a supported feature, the translation service will also perform the feature translation. Otherwise, the translation service may return an error message indicating that the received IM message includes an unsupported feature for the destination IM network. Upon satisfactory translation, the clearinghouse server forwards the translated IM message towards the destination IM network.

17 Claims, 3 Drawing Sheets

(56) References Cited

U.S. PATENT DOCUMENTS

| | | | |
|---|---|---|---|
| 7,200,680 B2* | 4/2007 | Evans et al. | 709/246 |
| 7,757,003 B2 | 7/2010 | Daniell et al. | |
| 7,941,493 B2* | 5/2011 | Daniell et al. | 709/206 |
| 2003/0087632 A1* | 5/2003 | Sagi et al. | 455/414 |
| 2004/0068584 A1 | 4/2004 | Costa-Requena et al. | |
| 2005/0027805 A1 | 2/2005 | Aoki | |
| 2009/0125591 A1* | 5/2009 | Kirkpatrick | 709/206 |

OTHER PUBLICATIONS

Official Communication for U.S. Appl. No. 11/125,809 mailed Dec. 24, 2008.

Official Communication for U.S. Appl. No. 11/125,809 mailed Jun. 19, 2009.

Official Communication for U.S. Appl. No. 11/125,809 mailed Sep. 4, 2009.

Official Communication for U.S. Appl. No. 12/545,002 mailed Apr. 13, 2011.

Official Communication for U.S. Appl. No. 12/545,002 mailed Oct. 14, 2011.

Official Communication for U.S. Appl. No. 12/545,002 mailed Mar. 29, 2012.

* cited by examiner

CLEARINGHOUSE FOR MESSAGES BETWEEN DISPARATE NETWORKS

CROSS-REFERENCE TO RELATED APPLICATIONS

This is a continuation of U.S. patent application Ser. No. 12/545,002, entitled "Clearinghouse For Messages Between Disparate IM Networks," filed Aug. 20, 2009, which is a continuation of U.S. patent application Ser. No. 11/125,809, filed May 10, 2005, now issued U.S. Pat. No. 7,626,991, which claims the benefit of U.S. Provisional Application Ser. No. 60/569,915 filed on May 10, 2004, the benefit of the earlier filing dates are hereby claimed under 35 U.S.C. §§119 and 120 and 37 C.F.R. §1.78, and which are each further incorporated by reference in their entirety herein.

FIELD OF THE INVENTION

The present invention relates generally to message systems, and more particularly, but not exclusively, to a clearinghouse managing a message between potentially disparate instant messaging (IM) networks.

BACKGROUND OF THE INVENTION

In its early configurations, instant messaging (IM) was but a trivial technology providing little more that email without lag time. IM is significantly different, today. Today, IM delivers far more than mere text capability. Many of today's IM software allows a user to swap files, share applications, play computer games, trade digital greeting cards, and interact via streaming audio and video. Moreover, a user can employ IM to send text messages to cell phones and pagers, as well as to send voice calls to telephones.

Instant messaging is quickly becoming an essential part of today's personal computing infrastructures. There are now a wide variety of IM client products with their associated IM networks from which a user may select. However, choosing one is not always easy. In many cases, such IM clients and IM networks cannot intercommunicate. Thus, a user employing one IM client may not be able to communicate with another user employing a disparate IM client. This may sometimes result in a user selecting an IM client and associated IM network based on what their friends, employer, or that like, may have selected, rather than based on features, functions, costs, and similar factors. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for managing interoperability between disparate networks, such as IM networks. In one embodiment of the invention, a clearinghouse server is provided that receives an IM message from a potentially disparate IM network. The clearinghouse server examines the received IM message to determine the destination IM network. The clearinghouse server also examines the message to determine whether the received IM message is in a compatible protocol for the destination IM network. Should the IM message be incompatible for the destination IM network, the clearinghouse server may employ a translation service to translate the received IM message into a compatible protocol for the destination IM network. The translation service may further determine if the destination IM network supports a feature employed by the received IM message. If the feature can be translated to a supported feature, the translation service will also perform the feature translation. Otherwise, the translation service may return an error message indicating that the received IM message includes a feature unsupported by the destination IM network. Upon satisfactory translation, the clearinghouse server forwards the translated IM message towards the destination IM network.

Illustrative Operating Environment

Figure 1:
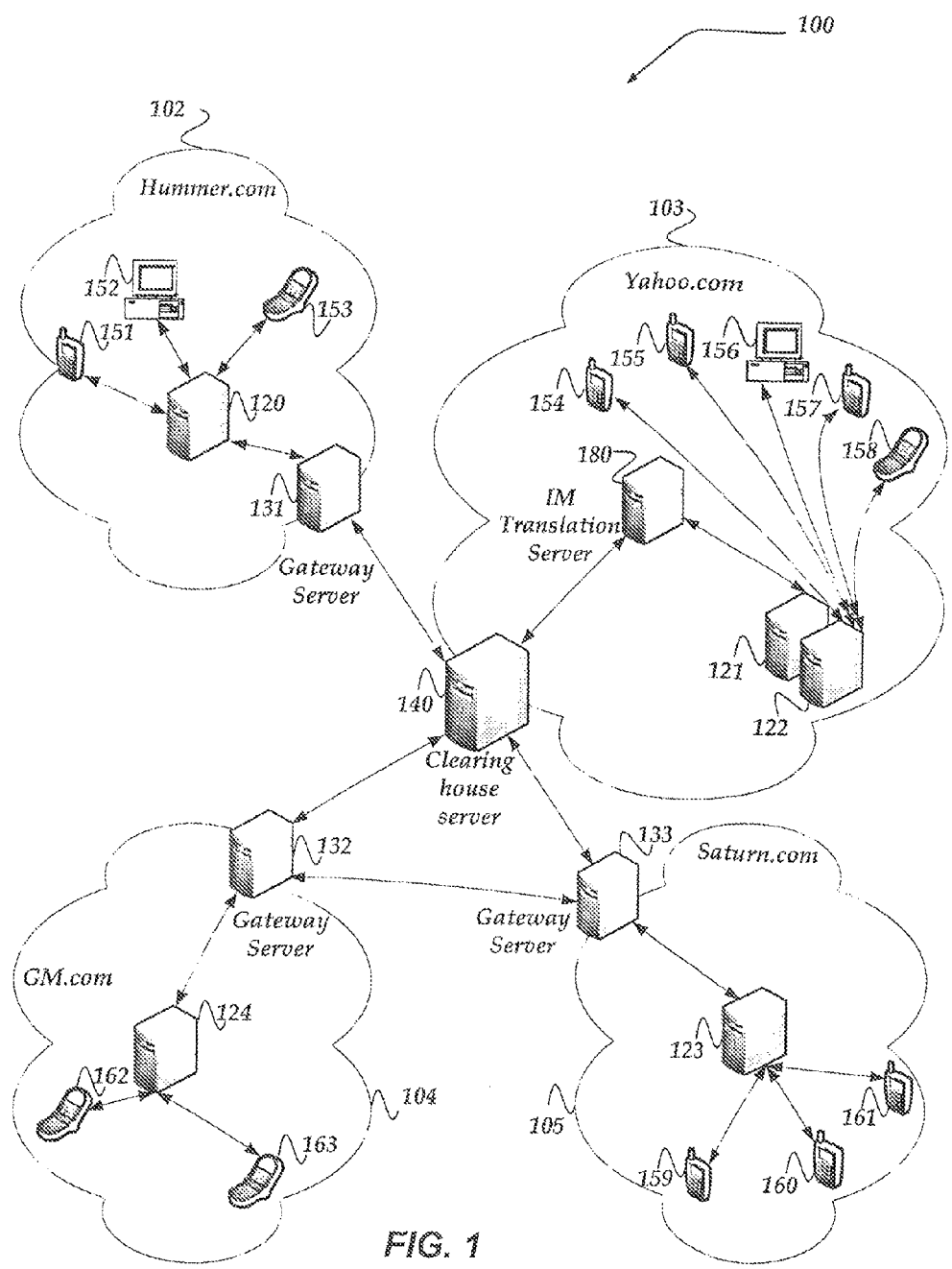
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes four IM networks 102-105. Each IM network 102 and 104-105 includes a gateway server. That is, IM network 102 includes gateway server 131; IM network 104 includes gateway server 132; and IM network 105 includes gateway server 133. IM network 103 however includes clearinghouse server 140. IM network 102 further includes home server 120, and client devices 151-153. Home server 120 is in communication with client devices 151-153 and with gateway server 131. IM network 104 further includes home server 124, and client devices 162-163. Home server 124 is in communication with client devices 162-163 and with gateway server 132. IM network 105 includes home server 123, and client devices 159-161. Home server 123 is in communication with client devices 159-161 and with gateway server 133. IM network 103 includes home servers 121-122, IM translation server 180, and client devices 154-158. Home servers 121-122 are in communication with client devices 154-158 and with IM translation server 180. IM translation server 180 in turn is in communication with clearinghouse server 140. In addition, gateway servers 131-133 are each in communication with clearinghouse server 140. Gateway server 132 is also in communication with gateway server 133.

Client devices 151-163 may include virtually any computing device capable of receiving and sending a message over a network, such as their respective IM networks 102-105, to and from another computing device, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 151-163 may be any device that is capable of connecting using a wired or wireless communication medium such as a PDA, POCKET PC, wearable computer, and any other device that is equipped to communicate over a wired and/or wireless communication medium. It is clear that client devices 151-163 may comprise a variety of different computing devices. For example, client device 151 may be a pager, while client device 156 is a personal computer, and so forth.

Each client device may include a browser application that is configured to receive and to send web pages, web-based messages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 151-163 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

Client devices 151-163 may further include a client application that is configured to manage various actions on behalf of the client device. For example, the client application may enable a user to interact with the browser application, email application, and the like, to manage a communication with another device. For example, the user may employ the client application, in part, to send an IM message to another client device within its same IM network or even towards a client device in another IM network. In one embodiment, client devices 151-163 include an IM client application that is configured to perform actions, and enable communication of IM messages to another computing device using a predetermined IM protocol.

IM networks 102-105 are configured to couple one computing device to another computing device to enable them to communicate. IM networks 102-105 are enabled to employ any form of computer readable media for communicating information from one electronic device to another. Also, IM networks 102-105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, IM networks 102-105 include any communication method by which information may travel between client devices and a home server.

As represented in FIG. 1, however, IM networks 102-104 are arranged to employ disparate IM networking protocols and to provide potentially disparate IM client features. For example, IM network 102 may provide IM voice capability, while IM networks 104-105 might not include IM voice capability. In one embodiment, IM networks 104-105 may employ compatible IM networking protocols and support substantially the same IM client features. Thus, as shown, gateway servers 132 and 133 may establish a trusted relationship with each other. Employing the trusted relationship, gateway servers 132-133 may enable communications to be sent directly between IM networks 104-105.

In one embodiment, IM networks 102-105 may represent IM network domains that are managed by their respective home servers. Such IM network domains may be referenced through traditional domain naming conventions. For example, as illustrated in FIG. 1, IM network 102 may also be referred to as Hummer.com; IM network 103 may be referred to as Yahoo.com; IM network 104 may be referred to as GM.com; and IM network 105 may be referred to as Saturn.com.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Although not illustrated, gateway servers 131-133 and clearinghouse 140 may communicate over yet another network, such as the Internet, or virtually any other communication link.

Home servers 120-124 may include any computing device that is capable of connecting to another computing device, such as client devices 151-163, gateway servers 131-133, and the like, to enable IM communication between IM capable devices. Typically, each home server (120-124) is configured to operate using a predetermined IM network protocol. For example, home server 120 may employ a disparate IM network protocol from home servers 121-124. Similarly, home servers 121-122 may employ a different IM network protocol from home server 120, and/or servers 123-124. Moreover, each home server may support IM client applications that employ potentially incompatible features from another home server. Thus, for example, client devices 151-153 may support IM voice features, while client devices 159-163 may not. Devices that may operate as home servers 120-124 include personal computers desktop computers, multiprocessor systems, microprocessor-based or programmable consumer electronics, network PCs, servers, and the like.

Gateway servers 131-133 may include any computing device capable of connecting to an IM network to enable a user of at least one of client devices within the IM network to send and receive communications from outside of the IM network. Devices that may operate as gateway servers 131-133 include personal computers desktop computers, multiprocessor systems, microprocessor-based or programmable consumer electronics, network PCs, servers, and the like. In addition, gateway servers 131-133 may operate as a proxy server, a gateway, a firewall, and the like.

Gateway servers 131-133 and/or home servers 120-124 may also be configured to recognize that an IM message is destined for a non-internal IM network. For example, gateway server 131 and/or home server 120 may receive an IM message, for example, from client device 151. Gateway server 131 and/or home server 120 may examine a packet header associated with the received IM message and determine that the IM message is intended for a computing device associated with an IM network other than IM network 102. Gateway server 131 and/or home server 120 may then employ a policy decision to route the received IM message towards clearinghouse server 140.

Gateway servers 131-133 are not constrained to routing IM messages to clearinghouse server 140. For example, gateway servers 131-133 may determine that an IM message is destined to an IM network that is compatible with its own IM network. In this instance; gateway servers 131-133 may elect to communicate with each other, rather than through clearinghouse server 140. Thus, as illustrated, gateway servers 132-133 may communicate with each other. In one embodiment, gateway servers 132-133 may employ a secure communications channel between each other with which to communicate. The secure communications channel may employ any of a variety of mechanisms.

Thus, each gateway server (131-133) and clearinghouse server 140 includes routing and policy information. For example, gateway server 132 may include routing and policy information that indicates a specific route to gateway server 133, and a default route to clearinghouse server 140, for IM messages sent external to IM network 104. Similarly, gateway server 133 may include routing and policy information for IM messages sent external to IM network 105 that indicates a specific route to gateway server 132, and a default route to clearinghouse 140. Gateway server 131 may also include routing and policy information for IM messages sent external to IM network 102 that indicates a default route to clearinghouse 140.

As a further example, client device 162 within IM network 104 may intend to send an IM message to client device 158 within IM network 105. As represented, IM networks 104-105 employ substantially similar IM message protocols, and features, and further include a trusted relationship with one another. Thus, communications between IM networks 104-105 may be sent directly between gateway servers 132 and 133.

In another example, client device 162 within IM network 104 may intend to send another IM message to client device 151 within IM network 102. Gateway server 132 may then employ its default routing and policy information to send the IM message to clearinghouse server 140. Clearinghouse server 140 in conjunction with services from IM translation server 180, forward the IM message towards client device 151, through gateway server 131.

Clearinghouse server 140 is described in more detail below in conjunction with FIG. 2. Briefly, however, clearinghouse server 140 operates substantially similar to gateway servers 131-133. However, clearinghouse server 140 further provides an IM clearinghouse capability to potentially disparate IM networks. Thus, clearinghouse server 140 may receive IM messages from IM network 102 through gateway server 131 that may be destined for IM network 105. Clearinghouse server 140 may examine the received IM message to determine the destination IM network. In one embodiment, clearinghouse server 140 may examine a packet header to determine the message destination. Clearinghouse server 140 may further determine whether the received IM message is using an IM message protocol, and includes IM features that are compatible with the destination IM network. Clearinghouse server 140 may send the incompatible IM message to IM translation server 180 to be translated into a compatible protocol and/or feature set. Clearinghouse server 140 may then send the compatible IM message towards the destination IM network. Devices that may operate as clearinghouse server 140 include personal computers desktop computers, multiprocessor systems, microprocessor-based or programmable consumer electronics, network PCs, servers, and the like. In addition, clearinghouse server 140 may be further configured to operate as a proxy server, a gateway, a firewall, and the like.

IM translation server 180 may include virtually any computing device capable of communicating with clearinghouse server 140 to provide IM translation services. Such IM translation services include, but are not limited to, translating one IM message protocol into another IM message protocol, translating one IM feature into another IM feature, and so forth. IM translation server 180 may further provide a message to clearinghouse server 140 indicating whether a translation is successful, unable to be performed, and the like.

IM translation server 180 may also be configured to provide IM routing functionality between computing devices. Thus, in one example, IM translation server 180 may receive an IM message from clearinghouse 140 and forward the IM message to home servers 121-122.

Devices that may operate as IM translation server 180 include personal computers desktop computers, multiprocessor systems, microprocessor-based or programmable consumer electronics, network PCs, servers, and the like.

Although clearinghouse 140 and IM translation server 180 are illustrated as distinct devices, the invention is not so limited. For example, the functionality of clearinghouse 140 and IM translation server 180 may be implemented in one computing device, distributed across multiple computing devices, or the like. Similarly, at least some of the functionality of gateway servers 131-133, clearinghouse 140, and home servers 120-124 may be combined. For example, functionality of gateway server 131 and home server 120 may be combined into a single computing device, distributed across multiple devices, or the like, without departing from the scope or spirit of the invention.

Illustrative Server Environment

Figure 2:
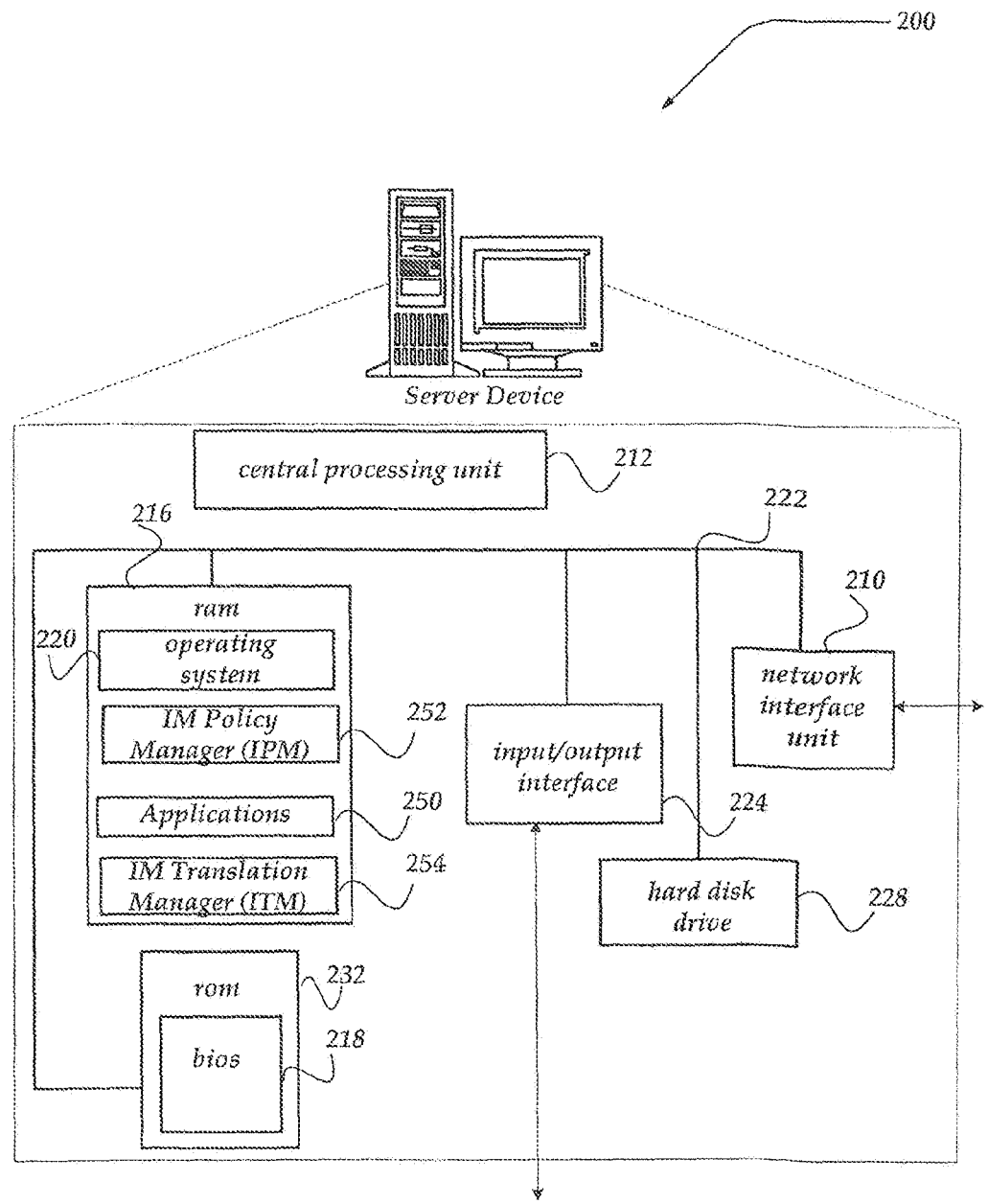
FIG. 2 shows one embodiment of a server device that may be included in a system implementing the invention.

FIG. 2 shows one embodiment of a server device, according to one embodiment of the invention. Server device 200 may include many more components than those shown. The components shown, however, are sufficient to disclose an illustrative embodiment for practicing the invention. In one embodiment server device 200 may be configured to operate as clearinghouse server 140 in FIG. 1. In another embodiment device 200 may be configured to operate as an integrated device performing the functionality of clearinghouse server 140 and IM translation server 180 of FIG. 1.

Server device 200 includes processing unit 212, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server device 200. Any general-purpose operating system may be employed. Basic input/output system ("BIOS") 218 is also provided for controlling the low-level operation of server device 200. As illustrated in FIG. 2, server device 200 also can communicate with the Internet, or some other communications network, such as IM network 103 in FIG. 1, or the like, via network interface unit 210, which is constructed for use with various communication protocols including the TCP/IP protocol. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 also includes input/output interface 224 for communicating with external devices, such as a mouse, keyboard, scanner, or other input devices not shown in FIG. 2. Likewise, server device 200 may further include additional mass storage facilities such as hard disk drive 228. Hard disk drive 228 is utilized by server device 200 to store, among other things, application programs, databases, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data-structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as IM Policy Manager (IPM) 252, and IM Translation Manager (ITM) 254, or the like.

IPM 252 is configured to operate as a clearinghouse for IM messages from potentially disparate IM networks. Thus, IPM 252 may receive an IM message from one IM network, perform a routing and policy decision upon the IM message, and forward the IM message to a destination IM network. IPM 252 may make the routing decision based, at least in part, on a packet header associated with the received IM message. In one embodiment, IPM 252 may employ a routing table, policy table, and the like, (not shown) to make the routing and policy decisions.

IPM 252 may further examine the received IM message and determine whether a message protocol associated with the IM message is compatible with a message protocol associated with the destination IM network. If IPM 252 determines that the message protocols are not compatible, IPM 252 may request that ITM 254 perform a message protocol translation.

In addition, IPM 252 may also be configured to determine whether the received IM message employs an IM message feature that may not be compatible with available IM message features associated with the destination IM network. For example, IPM 252 may determine that the received IM message may employ a multimedia feature, display feature, or the like that the destination IM network does not support. Thus, IPM 252 may also request that ITM 254 attempt to perform an IM feature translation.

ITM 254 may be configured to receive an IM message and determine an appropriate IM message protocol into which to translate the received IM message. ITM 254 may employ, for example, a protocol translation table, spreadsheet, application, script, or the like, to enable the message protocol translation.

ITM 254 may also be configured to determine whether an IM message feature employed by the received IM message is supported by the destination IM network. If it is determined that the IM message feature is not supported by the destination IM network, ITM 254 may be configured to attempt to translate the IM message feature into a compatible IM message feature that is supported by the destination IM network. Thus, for example, if the received IM message employs a voice feature that is not supported, ITM 254 may attempt to translate the voice message into a text message, or other supported feature format.

If ITM 254 determines that it is unable to translate the received IM message feature, and/or protocol to an IM message feature and/or protocol for the destination IM network, ITM 254 may return an error message. The error message may include any of a variety of information including information indicating which feature and/or protocol is at error.

Although IPM 252 and ITM 254 are illustrated within a single server device 200, the invention is not so constrained. For example, as illustrated in FIG. 1, such functions may also be allocated to different computing devices.

Generalized Operation

Figure 3:
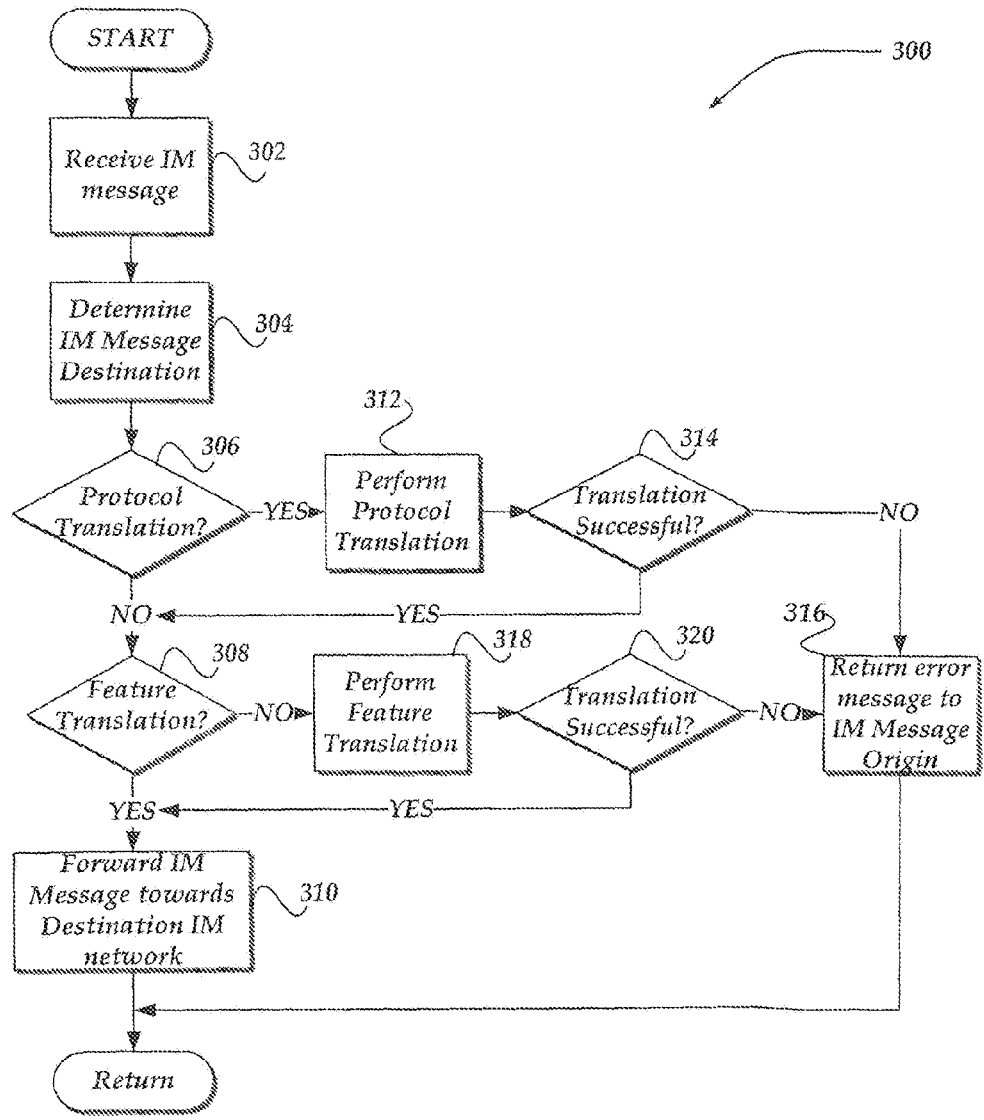
FIG. 3 illustrates a logical flow diagram generally showing one embodiment of a process for managing messages between potentially disparate IM networks, in accordance with the present invention.

The operation of certain aspects of the invention will now be described with respect to FIG. 3. FIG. 3 illustrates a logical flow diagram generally showing one embodiment of process 300 for managing messages between disparate IM networks, in accordance with the present invention. Process 300 may be implemented within server device 200 of FIG. 2, and/or across clearinghouse server 140 and IM translation server 180 of FIG. 1.

Process 300 begins, after a start block, at block 302, where an IM message is received. The IM message may be received from any of a variety of network communications links as described above. Processing moves next to block 304, where a destination IM network is determined. In one embodiment, the destination IM network is determined based, at least in part, on a packet header associated with the received IM message.

Process 300 flows next to decision block 306, where a determination is made whether the received IM message is in a message protocol format that is compatible with the determined destination IM network's message protocol format. In one embodiment, a table, spreadsheet, database, application, or the like, is employed to assist in determining message protocol compatibility. If it is determined that the IM message protocol formats between the received IM message and the destination IM network, processing continues to decision block 308; otherwise, processing flows to block 312.

At block 312, a message protocol translation is attempted to be performed. Processing continues to decision block 314, where a determination is made whether the message protocol translation is successful. If it is determined that the message protocol translation is successful, processing flows to decision block 308; otherwise, processing flows to block 316. At block 316, an error message is sent to the source of the received IM message. Processing then returns to a calling process to perform other actions.

At decision block 308, a determination is made whether a feature employed within the received IM message is compatible with supported features within the destination network. If there is at least one feature that is not compatible with supported features within the destination IM network, processing flows to block 318. At block 318, a message feature translation is attempted. In one embodiment, a table, spreadsheet, database, application, or the like, is employed to attempt to identify feature supported in the destination IM network into which the IM message feature might be translated. If a feature is identified, a translation may be performed. For example, in one embodiment, the received IM message may include a voice message, where voice messages may not be supported within the destination IM network. At block 318, an attempt may be made to translate the voice message into a supported feature format. For example, at attempt may be made to translate the voice message into a text message format, or the like, that is supported by the destination IM network. Processing then proceeds to decision block 320, where a determination is made whether the feature translation is successful. A translation may be determined to be successful, based on any of a variety of criteria. In any event, if the feature translation is determined to be successful, processing flows to block 310; otherwise, processing flows to block 316 to perform as described above. Upon completion of block 316, processing returns to the calling process to perform other actions.

At block 310, the IM message, either translated or untranslated is forwarded to the determined destination IM network. Upon completion of block 310, processing returns to the calling process to perform other actions.

Although the above describes a clearinghouse for interoperability between potentially disparate IM networks, the invention is not so limited. For example, the clearinghouse may be employed for virtually any networking communications that may desire protocol and/or feature translations. As such, virtually any networking communications, in addition to IM networks, may employ the invention, without departing from the scope or spirit of the invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system, comprising:
    a clearing house server device having one or more processors to perform actions to manage translations of messages between disparate messaging networks based on one of a message protocol or message format; and
    a first gateway device within a first messaging network, the first gateway device having one or more processors to perform actions, including:
        receiving a message from a first client device within the first messaging network, the message being directed to a second client device in a second messaging network;
        examining the message to determine whether a message protocol and format of the message are compatible with a message protocol and format of the second messaging network;
        when the message protocols and formats are determined to be compatible, sending the message to the second gateway device over a secure communications channel between the first gateway device and the second gateway device, wherein the secure communications channel is established by the first gateway device and the second gateway device based on an established trust relationship between the first gateway device and the second gateway device and absent routing the message through the clearing house server; and
        when the message protocols or formats are determined to be incompatible, sending an error message to the first client device and providing the message to the clearing house server device to be translated and forwarded to the second gateway device.

2. A system, comprising,
    a clearing house server device having one or more processors to perform actions to manage translations of messages between disparate messaging networks based on one of a message protocol or message format; and a first gateway device within a first messaging network, the first gateway device having one or more processors to perform actions, including:

receiving a message from a first client device within the first messaging network, the message being directed to a second client device in a second messaging network;

examining the message to determine whether a message protocol and format of the message are compatible with a message protocol and format of the second messaging network; and when the message protocols and formats are determined to be compatible, sending the message to the second gateway device over a secure communications channel between the first gateway device and the second gateway device, wherein the secure communications channel is established by the first gateway device and the second gateway device based on an established relationship between the first gateway device and the second gateway device and absent routing the message through the clearing house server, wherein the clearing house server device performs actions, further including:

when it is determined that a translation of the message from the first message format or protocol to the second message protocol or format is unsuccessful, sending an error message to the first client device indicating which feature is at error.

3. The system of claim 1, wherein the clearing house server device resides outside of the first messaging network and the second messaging network.

4. The system of claim I. wherein the clearing house server device employs a translation service to translate the message.

5. The system of claim 1, wherein translation of the message protocol or format includes converting of an audio portion of the message to a text portion.

6. A server device, comprising:

a transceiver for receiving and sending messages; and a processor in communication with the transceiver and configured to perform actions as a gateway device within a first messaging network, including:

receiving a message from a first client device within the first messaging network, the message being directed to a second client device in a second messaging network; determining whether at least a message protocol and format of messages from the first messaging network are compatible with a message protocol and format of messages from the second messaging network;

when the message protocols and formats are determined to be compatible, sending the message to the second gateway device over a secure communications channel between the first gateway device and the second gateway device rather than through a clearing house server device, wherein the secure communications channel is established by the first gateway device and the second gateway device based on an established trust relationship between the first gateway device and the second gateway device; and when the message protocols or formats are determined to be incompatible, sending an error message to the first client device and providing the message to the clearing house server device to be translated and forwarded to the second gateway device.

7. A server device, comprising:

a transceiver for receiving and sending messages; and a processor in communication with the transceiver and configured to perform actions as a gateway device within a first messaging network, including:

receiving a message from a first client device within the first messaging network, the message being directed to a second client device in a second messaging network;

determining whether at least a message protocol and format of messages from the first messaging network are compatible with a message protocol and format of messages from the second messaging network; and when the message protocols and formats are determined to be compatible, sending the message to the second gateway device over a secure communications channel between the first gateway device and the second gateway device rather than through a clearing house server device, wherein the secure communications channel is established by the first gateway device and the second gateway device based on an established trust relationship between the first gateway device and the second gateway device, wherein the server device performing actions, further including:

when the message protocols or formats are determined to be incompatible, providing the message to the clearing house server device to be translated and forwarded to a second gateway device in the second messaging network.

8. The server device of claim 7, wherein the clearing house server device performs actions, further including:

when it is determined that a translation of the message from the first message format or protocol to the second message protocol or format is unsuccessful, sending an error message to the first client device indicating which feature is at error.

9. The server device of claim 6. Wherein at least the first gateway device employs routing and policy information indicating a default route to a clearing house server device for routing messages.

10. The server device of claim 6, wherein sending the message to the second gateway device is performed absent a protocol or format translation.

11. The server device of claim 6, wherein a protocol or format feature of the message includes an audio portion of the message.

12. The server device of claim 6, wherein the messaging networks are Instant Messaging (IM) networks.

13. The server device of claim 6, wherein determining whether at least a message protocol and format of messages from the first messaging network are compatible further comprises employing at least one of a table, spreadsheet, database, or an application to assist in the determination.

14. A storage device having stored thereon computer-executable instructions that when installed within a computer device enable the computer device to perform actions, including:

operating as a first gateway device within a first messaging network, the first gateway device having one or more processors to perform actions, including:

receiving a message from a first client device within the first messaging network, the message being directed to a second client device in a second messaging network;

determining whether at least a message protocol and format of messages from the first messaging network are compatible with a message protocol and format of messages from the second messaging network;

when the message protocols and formats are determined to be compatible, sending the message to the second gateway device over a secure communications channel between the first gateway device and the second gateway device absent a protocol or format translation and rather than sending the message through a clearing house server, and wherein the secure communications channel is established by the first gateway device and the second gateway device based on an established trust relationship between the first gateway device and the second gateway device; and when the message protocols or formats are determined to be incompatible, sending an error message to the first client device and providing the message to the clearing house server device to be translated and forwarded to the second gateway device.

15. A storage device having stored thereon computer-executable instructions that when installed within a computer device enable the computer device to perform actions, including, operating as a first gateway device within a first messaging network, the first gateway device having one or more processors to perform actions, including:

receiving a message from a first client device within the first messaging network, the message being directed to a second client device in a second messaging network;

determining whether at least a message protocol and format of messages from the first messaging network are compatible with a message protocol and format of messages from the second messaging network; and when the message protocols and formats are determined to be compatible, sending the message to the second gateway device over a secure communications channel between the first gateway device and the second gateway device absent a protocol or format translation and rather than sending the message through a clearing house server, and wherein the secure communications channel is established by the first gateway device and the second gateway device based on an established trust relationship between the first gateway device and the second gateway device, wherein the one or processors performing actions, further including:

when the message protocols or formats are determined to be incompatible, providing the message to the clearing house server device to be translated and forwarded to a second gateway device in the second messaging network.

16. The storage device of claim 15, wherein the clearing house server device performs actions, further including:

when it is determined that a translation of the message from the first message format or protocol to the second message protocol or format is unsuccessful, sending an error message to the first client device indicating which feature is at error.

17. The storage device of claim 14, wherein at least one of the first client device or the second client device is a mobile device.

* * * * *